United States Patent
Markman et al.

(10) Patent No.: US 9,325,547 B2
(45) Date of Patent: Apr. 26, 2016

(54) PREAMBLE IDENTIFICATION IN A MOBILE DTV SYSTEM

(75) Inventors: Ivonete Markman, Carmel, IN (US);
Wen Gao, West Windsor, NJ (US);
Richard W. Citta, Oak Park, IL (US)

(73) Assignee: Thomson Licensing, Issy les Moulineaux (FR)

( * ) Notice: Subject to any disclaimer, the term of this patent is extended or adjusted under 35 U.S.C. 154(b) by 867 days.

(21) Appl. No.: 13/505,329

(22) PCT Filed: Nov. 13, 2009

(86) PCT No.: PCT/US2009/006109
§ 371 (c)(1),
(2), (4) Date: May 1, 2012

(87) PCT Pub. No.: WO2011/059419
PCT Pub. Date: May 19, 2011

(65) Prior Publication Data
US 2012/0219071 A1     Aug. 30, 2012

(51) Int. Cl.
*H04N 7/26* (2006.01)
*H04L 27/02* (2006.01)
*H04L 1/00* (2006.01)
*H04L 25/03* (2006.01)
*H04N 21/2383* (2011.01)
*H04N 21/438* (2011.01)

(52) U.S. Cl.
CPC ............. *H04L 27/02* (2013.01); *H04L 1/0041* (2013.01); *H04L 25/03171* (2013.01); *H04N 21/2383* (2013.01); *H04N 21/4382* (2013.01)

(58) Field of Classification Search
CPC ............... H04N 21/23412; H04N 21/4382; H04N 21/2383; H04N 21/23611; H04N 19/89; H04N 21/23608; H04L 1/0041
See application file for complete search history.

(56) References Cited

U.S. PATENT DOCUMENTS

| | | | |
|---|---|---|---|
| 5,265,105 A * | 11/1993 | Iwane ........................... | 375/365 |
| 7,369,633 B2 | 5/2008 | Jiang et al. | |
| 2003/0012287 A1 | 1/2003 | Katsavounidis et al. | |
| 2004/0252229 A1* | 12/2004 | Jiang et al. ................. | 348/385.1 |
| 2007/0230460 A1* | 10/2007 | Jeong et al. .................... | 370/389 |
| 2007/0253502 A1* | 11/2007 | Park et al. ..................... | 375/265 |
| 2008/0175236 A1 | 7/2008 | Lee et al. | |
| 2009/0003459 A1 | 1/2009 | Limberg | |
| 2009/0052520 A1 | 2/2009 | Park et al. | |
| 2009/0103649 A1 | 4/2009 | Vare et al. | |
| 2009/0103657 A1* | 4/2009 | Park et al. ...................... | 375/340 |
| 2009/0110083 A1* | 4/2009 | Park et al. ................ | 375/240.27 |
| 2009/0125940 A1 | 5/2009 | Kim et al. | |
| 2009/0147889 A1 | 6/2009 | Chang et al. | |
| 2009/0262799 A1 | 10/2009 | Limberg | |
| 2009/0265751 A1 | 10/2009 | Limberg | |
| 2009/0285137 A1* | 11/2009 | Fujita et al. ................... | 370/310 |
| 2010/0091838 A1* | 4/2010 | Choi ........................ | 375/240.01 |

* cited by examiner

*Primary Examiner* — Jay Au Patel
*Assistant Examiner* — Neil Mikeska
(74) *Attorney, Agent, or Firm* — Robert D. Shedd; Jerome G. Schaefer; Ivonete Markman

(57) ABSTRACT

A preamble identifier flag in a reserved portion of a data field synchronization segment in a digital television (DTV) data field identifies the presence of preamble training data in a forward error correction (FEC) encoded portion of the DTV data field. The data field synchronization segment is not FEC encoded, thereby allowing detection of the preamble identifier flag without FEC decoding. The detection at a receiver of the preamble identifier flag in a DTV data field allows receiver elements, such as an equalizer and a FEC decoder, to more readily obtain and utilize the preamble training data, thereby enhancing reception and/or simplifying receiver design.

19 Claims, 6 Drawing Sheets

PREAMBLE IDENTIFICATION IN A MOBILE DTV SYSTEM

This application claims the benefit, under 35 U.S.C. §365 of International Application PCT/US2009/006109, filed Nov. 13, 2009, which was published in accordance with PCT Article 21(2) on May 19, 2011 in English.

FIELD OF INVENTION

The present invention generally relates to digital television (DTV) systems and method, and more particularly to mobile DTV systems and methods.

BACKGROUND

The Advanced Television Systems Committee (ATSC) standard for Digital Television (DTV) in the United States requires an 8-VSB transmission system which includes Forward Error Correction (FEC) as a means of improving system performance. (United States Advanced Television Systems Committee, "ATSC Digital Television Standard", (document A53.doc), Sep. 16, 1995.) FIG. 1 shows a simplified block diagram of a typical ATSC compliant DTV transmitter and receiver, emphasizing the FEC subsystem. As shown in FIG. 1, on the transmitter side, the FEC encoding subsystem includes a Reed-Solomon (RS) encoder, followed by a byte interleaver, and a trellis encoder. The FEC encoding subsystem is preceded by a data randomizer and followed by an 8-VSB modulator. On the receiver side, there is a corresponding FEC decoding subsystem which includes a trellis decoder, a byte de-interleaver and a RS decoder. The FEC decoding subsystem is preceded by an 8-VSB demodulator and followed by a data de-randomizer.

The ATSC DTV transmission scheme is not robust enough against Doppler shift and multipath radio interference, and is designed for highly directional fixed antennas, hindering the provision of expanded services to customers using mobile and handheld (M/H) devices. In an attempt to address these issues and to create a more robust and flexible system, it has been proposed, among other things, to add a new layer of FEC coding and more powerful decoding algorithms to decrease the Threshold of Visibility (TOV). (See, e.g., International Patent Publication No. WO 2008/144004 A1.) The added layer of FEC coding may require decoding techniques such as iterative (turbo) decoding (see, e.g., C. Berrou et al., "Near Shannon Limit Error—Correcting Coding and Decoding: Turbo-Codes (1)", Proceedings of the IEEE International Conference on Communications—ICC'93, May 23-26, 1993, Geneva, Switzerland, pp. 1064-1070; and M. R. Soleymani et al., "Turbo Coding for Satellite and Wireless Communications", Kluwer Academic Publishers, USA, 2002) and trellis decoding algorithms like the MAP decoder (see, e.g., L. R. Bahl et al., "Optimal Decoding of Linear Codes for Minimizing Symbol Error Rate", IEEE Transactions on Information Theory, Vol. IT-20, No. 2, March 1974, pp. 284-287.)

SUMMARY

In an exemplary embodiment in accordance with the principles of the invention, preamble training data conveying a priori tracking information for iterative forward error correction (FEC) decoding at a receiver, is included in a data field of a data burst which is transmitted to the receiver. The preamble training data may be encoded by all levels of FEC coding. A preamble identifier flag placed in a reserved field of a data field synchronization segment of the data field indicates the presence of the preamble training data in the data field. The data field synchronization segment is not FEC encoded. Detection of the preamble identifier flag allows the receiver to identify the presence of the preamble training data prior to FEC decoding. As a result, FEC decoding and equalization at the receiver are improved with lower overall latency.

In view of the above, and as will be apparent from the detailed description, other embodiments and features are also possible and fall within the principles of the invention.

BRIEF DESCRIPTION OF THE FIGURES

Some embodiments of apparatus and/or methods in accordance with embodiments of the present invention are now described, by way of example only, and with reference to the accompanying figures in which.

DESCRIPTION OF EMBODIMENTS

Other than the inventive concept, the elements shown in the figures are well known and will not be described in detail. For example, other than the inventive concept, familiarity with television broadcasting, receivers and video encoding is assumed and is not described in detail herein. For example, other than the inventive concept, familiarity with current and proposed recommendations for TV standards such as NTSC (National Television Systems Committee), PAL (Phase Alternation Lines), SECAM (SEquential Couleur Avec Memoire) and ATSC (Advanced Television Systems Committee) (ATSC), Chinese Digital Television System (GB) 20600-2006 and DVB-H is assumed. Likewise, other than the inventive concept, other transmission concepts such as eight-level vestigial sideband (8-VSB), Quadrature Amplitude Modulation (QAM), and receiver components such as a radio-frequency (RF) front-end (such as a low noise block, tuners, down converters, etc.), demodulators, interleavers, Reed-Solomon encoders/decoders, trellis encoders/decoders, FEC encoders/decoders, randomizers and derandomizers, equalizers, MAP decoders, Turbo decoders, correlators, leak integrators and squarers is assumed. Further, other than the inventive concept, familiarity with protocols such as Internet Protocol (IP), Real-time Transport Protocol (RTP), RTP Control Protocol (RTCP), User Datagram Protocol (UDP), is assumed and not described herein. Similarly, other than the inventive concept, familiarity with formatting and encoding methods such as Moving Picture Expert Group (MPEG)-2 Systems Standard (ISO/IEC 13818-1), H.264 Advanced Video Coding (AVC) and Scalable Video Coding (SVC) is assumed and not described herein. It should also be noted that the inventive concept may be implemented using various combinations of hardware and software which constitute a DTV receiver and processor. Finally, like-numbers on the figures represent similar elements.

Figure 2:
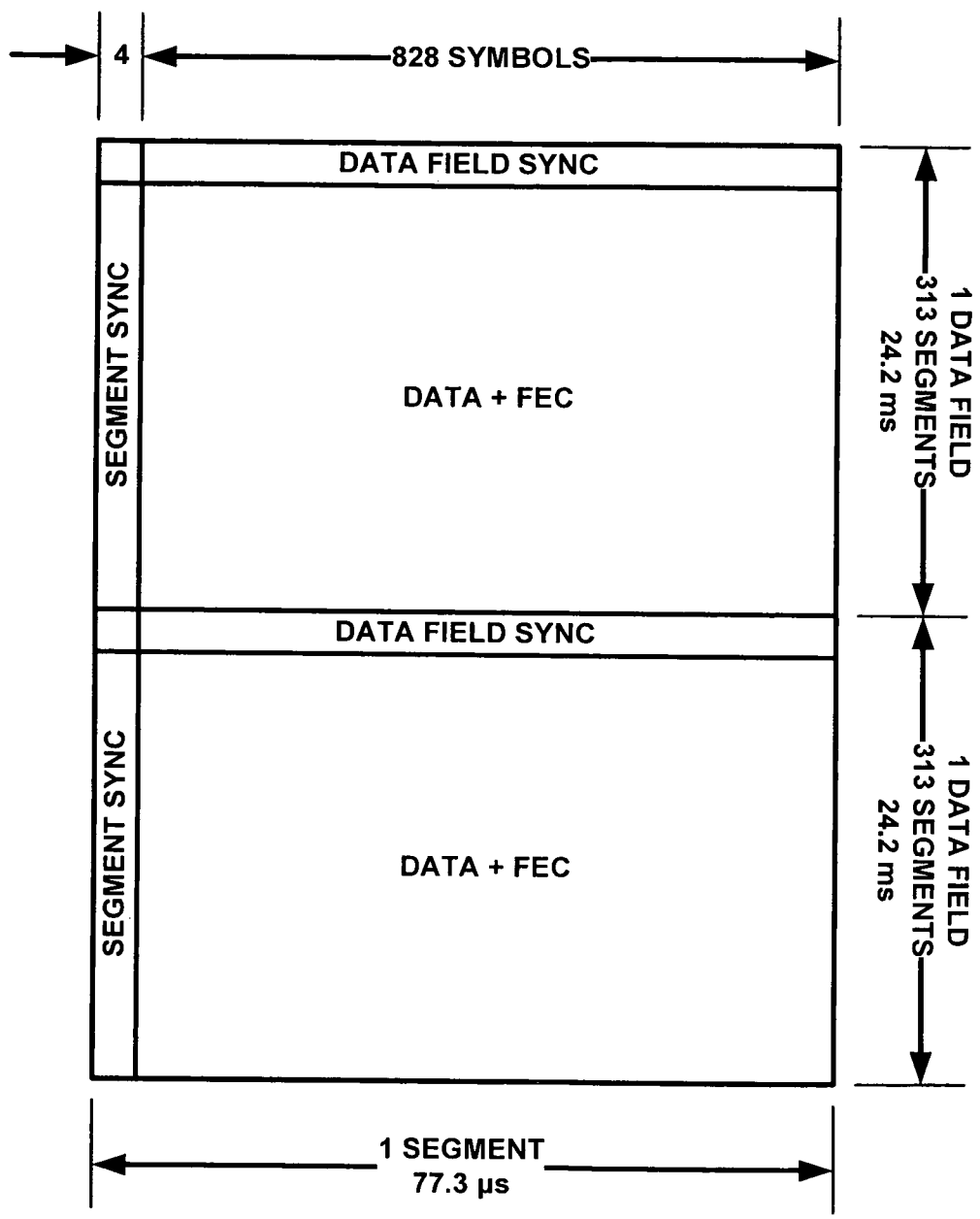
FIG. 2 illustrates the format of an ATSC-DTV data frame.

FIG. 2 shows the format of an ATSC-DTV data frame as transmitted. Each data frame consists of two data fields, each containing 313 segments. The first segment of each data field is a unique synchronization segment (Data Field Sync) shown in greater detail in FIG. 3 and further discussed below. Each of the remaining 312 segments of each data field, referred to as data segments, carries the equivalent data of one 188-byte MPEG-compatible transport packet and its associated FEC overhead. Note that while the 312 data segments of each data field contain FEC encoded data, the Data Field Sync segment is not FEC encoded and thus need not be FEC decoded at the receiver.

Figure 3:
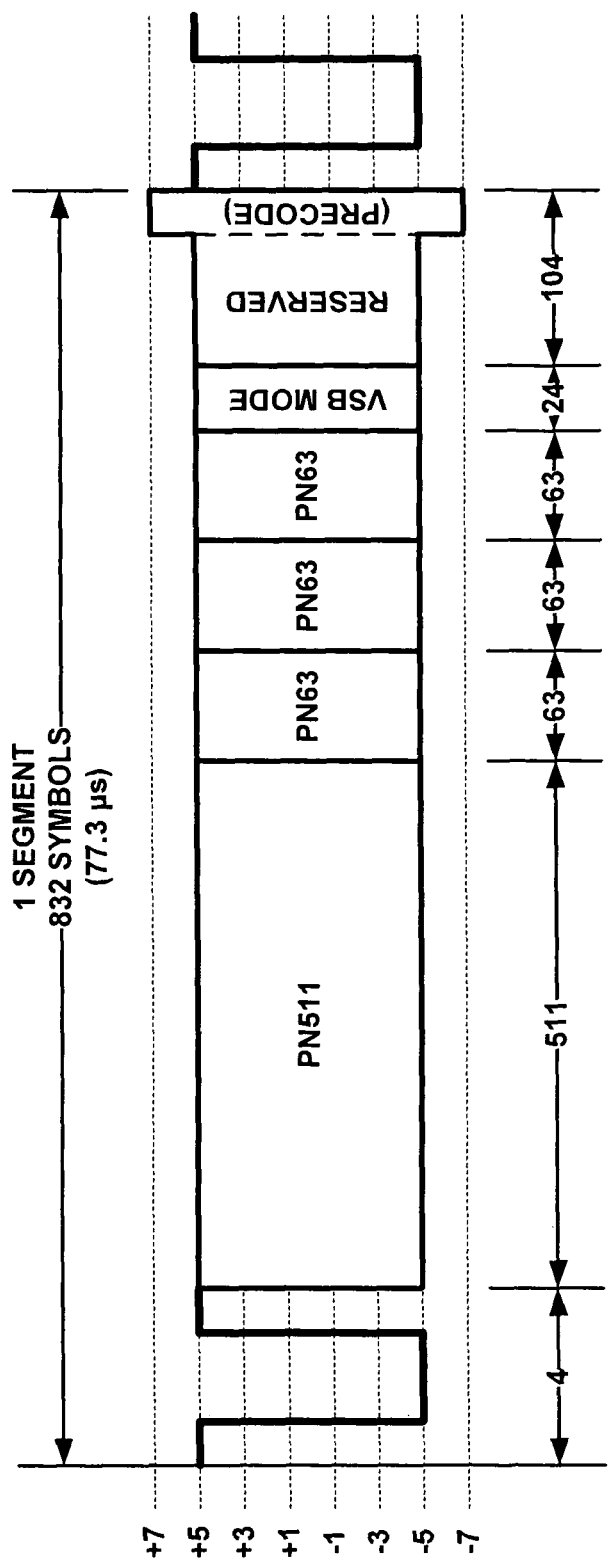
FIG. 3 illustrates the format of a Data Field Sync segment in an ATSC-DTV data frame.

Each segment consists of 832 8-VSB symbols. The first four symbols of each segment, including the Data Field Sync segments, form a binary pattern and provide segment synchronization. As shown in FIG. 3, which shows a Data Field Sync segment, the first four 8-VSB symbols of each segment have values of +5, −5, −5, and +5. This four-symbol segment sync signal also represents the sync byte of each 188-byte MPEG-compatible transport packet conveyed by each of the 312 data segments in each data field. The remaining 828 symbols of each data segment carry data equivalent to the remaining 187 bytes of a transport packet and its associated FEC overhead.

As shown in FIG. 2, each segment takes 77.3 µs to transmit, thereby taking 48.4 ms to transmit one ATSC-DTV data frame.

FIG. 3 shows a Data Field Sync segment in greater detail. As shown in FIG. 3, each Data Field Sync segment starts with a four-symbol segment sync followed by several pseudo random (PN) sequences, a VSB mode field and a reserved field of 104 symbols. (Note that the last 12 symbols of the reserved field, labeled PRECODE, are used in trellis coded terrestrial 8-VSB to replicate the last 12 symbols of the previous segment.) As described in greater detail below, an exemplary embodiment of the invention makes advantageous use of all or part of the reserved field of the Data Field Sync segment to provide improved reception and a simplified receiver design.

Figure 1:
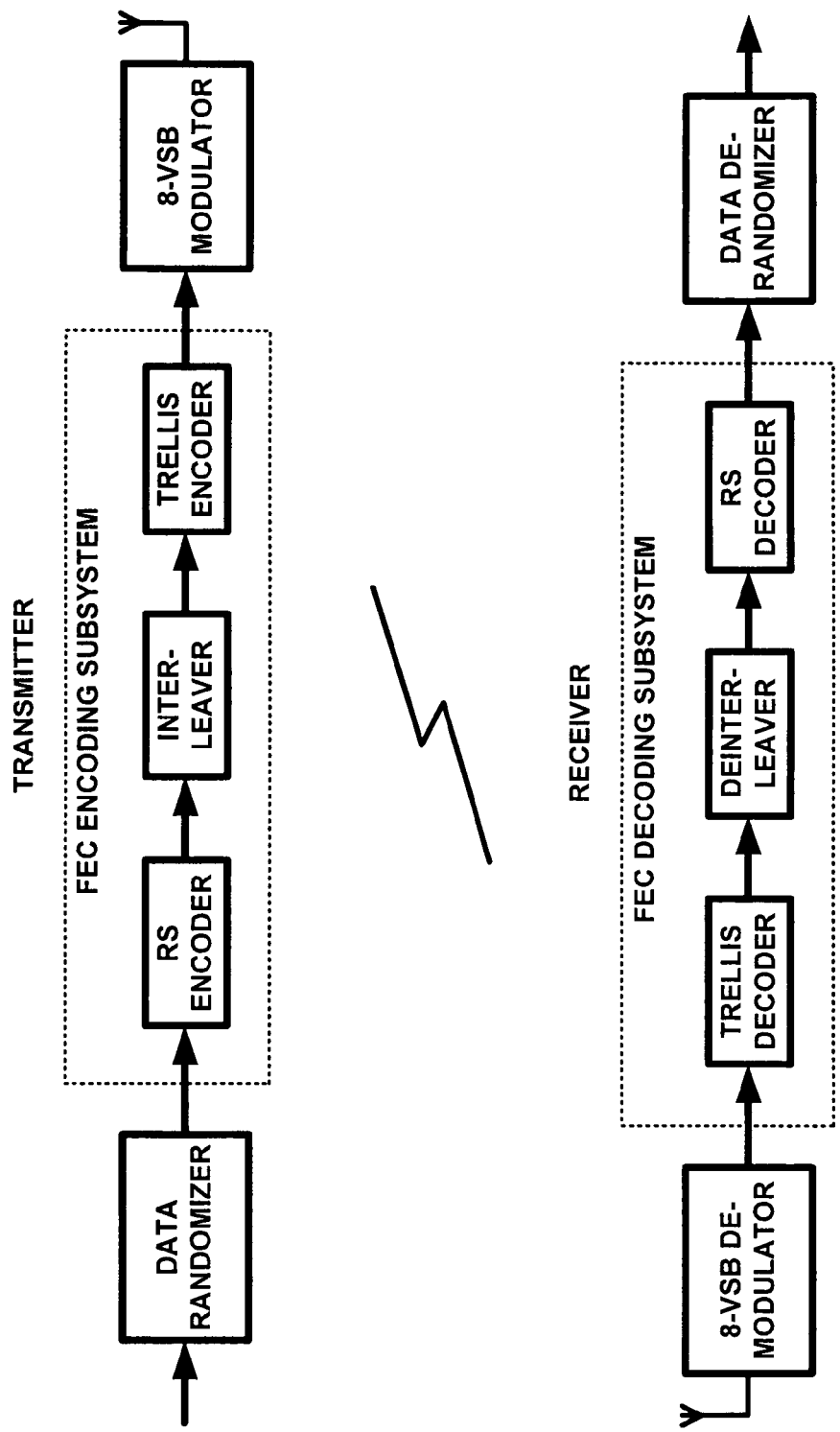
FIG. 1 is a block diagram of a digital television (DTV) system in accordance with the Advanced Television Systems Committee (ATSC) standard for DTV.
Figure 4:
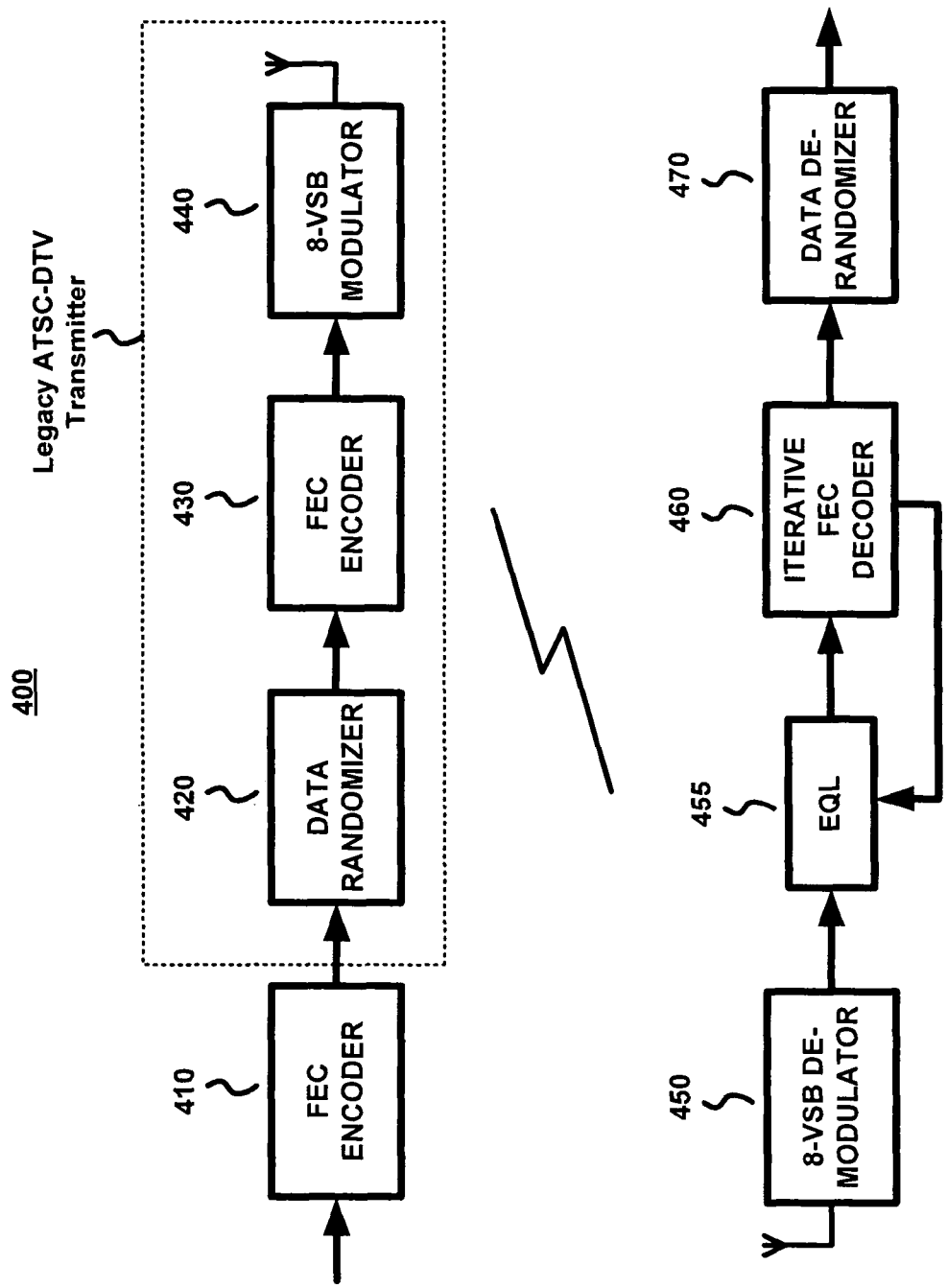
FIG. 4 is a block diagram of an exemplary DTV-M/H (Mobile/Handheld) system in accordance with the principles of the invention.

FIG. 4 shows a simplified block diagram of an exemplary transmitter and receiver for a mobile/handheld (M/H) DTV system 400 which includes two layers of FEC, as exemplified by FEC encoders 410 and 430 in the transmitter. FEC encoder 410 may implement multiple block and/or convolutional codes and comprise multiple block and/or convolutional interleavers. FEC encoder 430 corresponds to the FEC encoding subsystem in the transmitter of the ATSC DTV system of FIG. 1. Data randomizer 420, FEC encoder 430 and 8-VSB modulator 440 may be implemented as a conventional legacy ATSC DTV transmitter, such as shown in FIG. 1.

At the receiver, 8-VSB demodulator 450, which can be implemented conventionally, demodulates the received signal which is then equalized by equalizer 455. The equalized signal is provided to iterative FEC decoder 460 which performs turbo decoding of the various FEC encoders within 410 and 430, including MAP decoding of the ATSC trellis encoding implemented by FEC encoder 430 and the additional FEC encoding implemented by FEC encoder 410. Iterative FEC decoder 460 will perform a number of iterations (N) deemed necessary to achieve a desired performance. The decoded output of FEC decoder 460 is provided to data de-randomizer 470, which can be implemented conventionally. Equalizer 455, at the output of demodulator 450, receives feed-back from FEC decoder 460.

In an exemplary mobile DTV system, such as shown in FIG. 4, preamble training data segments, also called a priori tracking (APT) packets, may be transmitted in addition to the synchronization data present in the ATSC-DTV data frame described above. For example, the training data may be transmitted in the DATA+FEC segments shown in FIG. 2. Placing the preamble training data in DATA+FEC segments, however, would subject the preamble training data to all levels of FEC coding and interleaving introduced by FEC encoder 430, as well as being randomized by data randomizer 420. In addition, preamble training data in the DATA+FEC segments may also be subjected to all levels of FEC coding and interleaving introduced by FEC encoder 410.

An example of a data burst, containing preamble training data, that can be used in an exemplary mobile DTV system is given in TABLE 1. The data burst of TABLE 1 will be referred to herein as a DTV-M/H (Mobile/Handheld) data burst.

TABLE 1

| DTV-M/H Data burst | |
|---|---|
| Data Field F0 | Data Field Sync segment |
| | 260 Legacy ATSC Data Segments |
| | 52 Preamble Data Segments |
| Data Field F1 | Data Field Sync segment |
| | 52 DTV-M/H Data Segments |
| | 26 Legacy ATSC Data Segments |
| | 104 DTV-M/H Data Segments |
| | 130 Legacy ATSC Data Segments |
| Data Field F2 | Data Field Sync segment |
| | 312 Legacy ATSC Data Segments |

As shown in TABLE 1, each DTV-M/H data burst comprises three data fields, F0, F1 and F2. Each data field F0-F2 is analogous to a legacy ATSC-DTV data field, such as those shown in the legacy ATSC-DTV frame of FIG. 2. As such, each exemplary DTV-M/H data burst set forth in TABLE 1 corresponds to 1.5 frames of the legacy ATSC-DTV standard. Note that each data field F0-F2 starts with a Data Field Sync segment (such as shown in FIG. 3) followed by 312 FEC encoded data segments (or DATA+FEC segments). In typical operation, it is contemplated that a DTV-M/H receiving device will receive multiple legacy ATSC-DTV data fields or frames with one or more DTV-M/H data bursts in between.

In the exemplary DTV-M/H data burst of TABLE 1, preamble training data is contained in the first data field F0 as 52 data segments. When receiving an exemplary DTV-M/H data burst, a DTV-M/H receiver will discard the 260 Legacy ATSC data segments in Data Field F0 and process the remaining data including the 52 preamble training data segments. The preamble training data is to be utilized by a DTV-M/H receiver as training in order to enhance its performance. As described in greater detail below, signaling the presence of a preamble within a data field allows a simplified receiver design with improved performance.

In an exemplary embodiment of the invention, a subset or the entirety of the reserved field (FIG. 3) of the Data Field Sync segment of one or more data fields F0-F1 of the DTV-M/H data burst of TABLE 1 contains an indicator to identify the presence or absence of preamble training data in the data field. The indicator is referred to herein as an identifier flag. This flag may be a particular pattern, data sequence, or a PN sequence, which preferably can be easily regenerated by a receiver field sync detector. If a PN sequence is used, it could be a portion of the PN511 or the PN63 sequences already used in the Data Field Sync segment (FIG. 3) or a linear combination of these sequences. Because, as shown in TABLE 1, the preamble data signals the beginning of a burst of mobile data to the receiver, the use of such a flag in the Data Field Sync segment of Data Field F0 allows a receiver to identify the mobile data burst. This allows for improved reception and a simplified receiver design.

In an embodiment employing the exemplary DTV-M/H data burst structure of TABLE 1, the aforementioned identifier flag is placed in the Data Field Sync segment of data field F0. A further, complementary flag, such as a logical inverse of the preamble identifier flag in data field F0, may be placed in the Data Field Sync segments of the other two data fields, F1 and F2. One skilled in the art will understand that there are multiple possible alternatives. For example, the identifier flag could be placed in data field F1, and its logical inverse in data fields F0 and F2. In this case, the identifier flag would identify data field F1, with the preamble being in the previous data field F0. Likewise, the identifier flag could be placed in field F2 and its inverse in fields F0 and F1. In this case, the flag would identify data field F2, and the data field containing the preamble, F0, would be the subsequent field. In other embodiments, preamble training data for a data burst may be contained in one or more locations other than that shown in TABLE 1, including other data fields of the data burst.

Figure 5A:
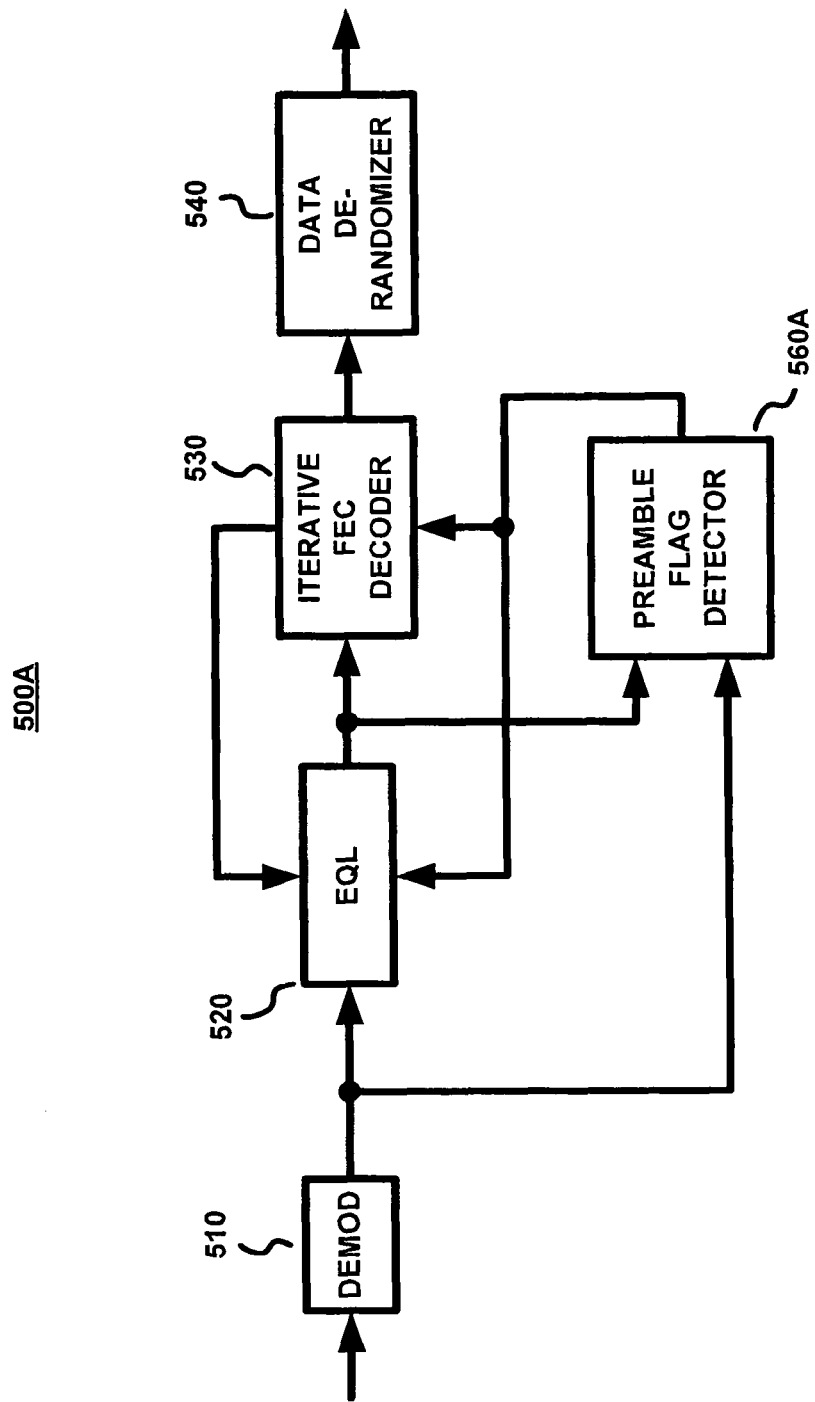
FIGS. 5A and 5B are block diagrams of exemplary embodiments of a receiver in accordance with the principles of the invention.

FIG. 5A is a block diagram of an exemplary embodiment of a DTV-M/H receiver 500A in accordance with the principles of the invention. The receiver 500A comprises demodulator 510, equalizer 520, iterative FEC decoder 530 and data de-randomizer 540.

The receiver 500A also comprises preamble flag detector 560A which detects the preamble identifier flag in the data stream at the output of demodulator 510 or equalizer 520. As discussed, the preamble identifier flag in the Data Field Sync segment of a data field provides an indication as to whether or not the data field contains the preamble training data. If the preamble flag detector 560A detects the preamble identifier flag, it provides an indication to equalizer 520 and iterative FEC decoder 530 accordingly. Once said indication is provided, equalizer 520 and FEC decoder 530 can expect to start receiving the preamble training data a known number of segments (e.g., 260, per TABLE 1) following the Data Field Sync segment containing the preamble identifier flag. Upon reception of the preamble, equalizer 520 and FEC decoder 530 can use the training data in the preamble to process the received encoded data; equalizer 520 uses the preamble training data to perform equalization of the demodulated signal at the output of demodulator 510, and FEC decoder 530 uses the preamble training data to perform iterative FEC decoding of the equalized signal at the output of equalizer 520. Data de-randomizer 540 de-randomizes the decoded data and can be implemented conventionally.

By contrast, because the preamble training data is FEC encoded, a conventional receiver would need to iteratively FEC decode the received data stream by multiple iterations before it can reliably detect the preamble training data and feed back the a priori information contained therein to the equalizer and/or other iterations of the FEC decoder. By utilizing a preamble identifier flag of the present invention, which is not FEC encoded, as described above, the exemplary receiver 500A can identify the presence of the preamble training data prior to the FEC decoder. Moreover, detection of the preamble identifier flag can be implemented more simply than detection of the preamble data itself. As such, replacement of a preamble data detector with preamble flag detector 560A represents a net simplification. In addition, the feedback path from iterative decoder 530 to equalizer 520 can be shortened (i.e., feedback from an earlier iteration of decoder 530 can be used), resulting in lower overall latency and thus improved receiver performance.

Figure 5B:
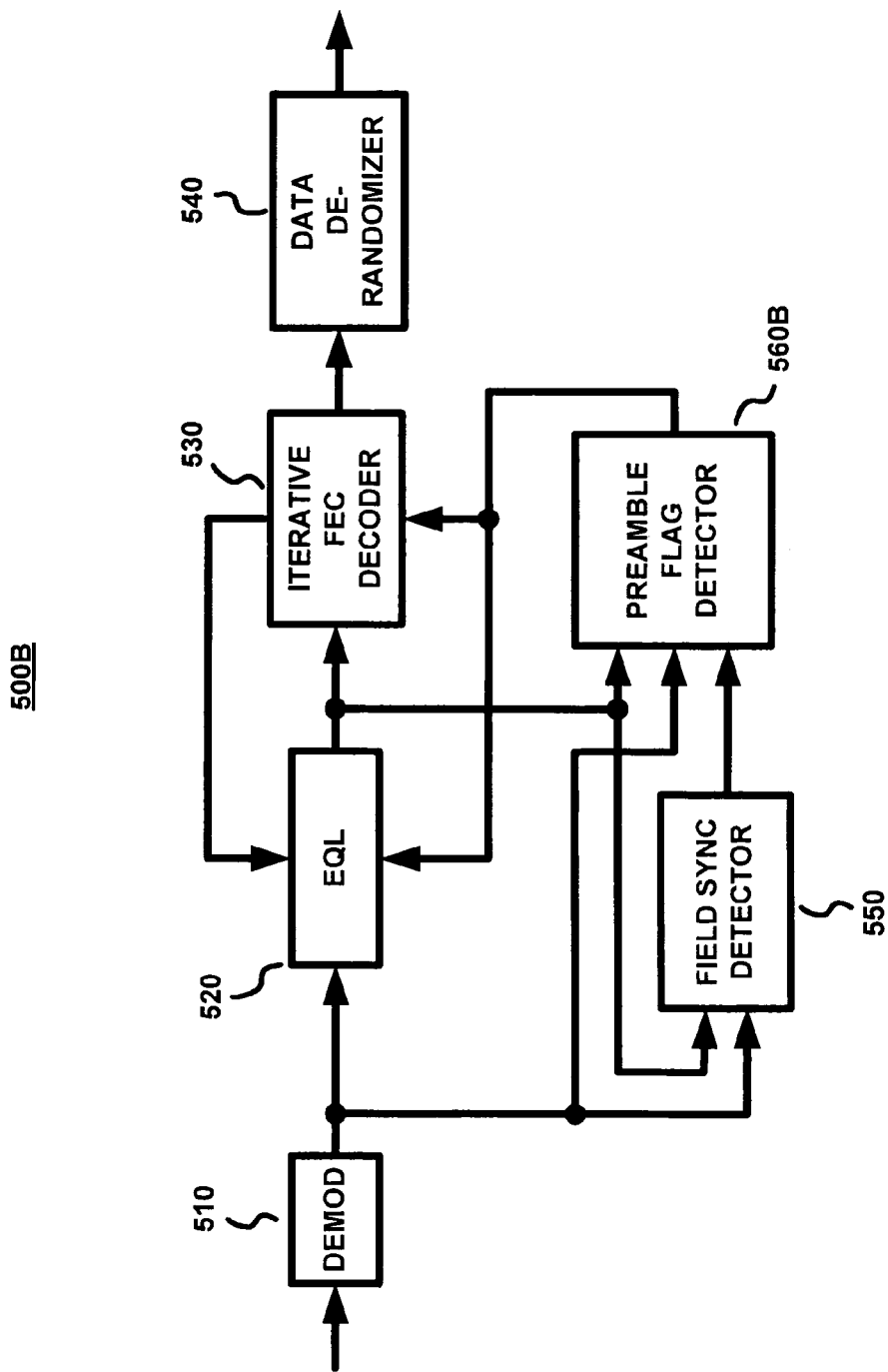

In a further embodiment of the invention shown in FIG. 5B, receiver 500B comprises field sync detector 550 which detects the Data Field Sync segment in the data stream at the output of demodulator 510 or equalizer 520 using correlation or any other suitable method. In the embodiment of FIG. 5B, preamble flag detector 560B receives an indication from field sync detector 550 of the presence of a Data Field Sync segment, thereby alerting the preamble flag detector 560B to search for the possible presence of a preamble identifier flag in the reserved field of the Data Field Sync segment. Upon detection of a Data Field Sync segment by detector 550, preamble flag detector 560B looks for the above-described identifier flag in the reserved field of the Data Field Sync segment. It should be noted that a field sync detector, such as 550, will typically be included in any receiver designed to receive data bursts with Data Field Sync segments, such as shown in FIG. 3. Moreover, by using the indication provided by the field sync detector 550, it may be possible to simplify the implementation of preamble flag detector 560B relative to that of detector 560A of the embodiment of FIG. 5A.

The principles of this invention can be extended to other mobile DTV systems and data frame and preamble training structures.

In view of the above, the foregoing merely illustrates the principles of the invention and it will thus be appreciated that those skilled in the art will be able to devise numerous alternative arrangements which, although not explicitly described herein, embody the principles of the invention and are within its spirit and scope. For example, although illustrated in the context of separate functional elements, these functional elements may be embodied in one, or more, integrated circuits (ICs). Similarly, although shown as separate elements, some or all of the elements may be implemented in a stored-program-controlled processor, e.g., a digital signal processor or a general purpose processor, which executes associated software, e.g., corresponding to one, or more, steps, which software may be embodied in any of a variety of suitable storage media. Further, the principles of the invention are applicable to various types of wired and wireless communications systems, e.g., terrestrial broadcast, satellite, Wireless-Fidelity (Wi-Fi), cellular, etc. Indeed, the inventive concept is also applicable to stationary or mobile receivers. It is therefore to be understood that numerous modifications may be made to the illustrative embodiments and that other arrangements may be devised without departing from the spirit and scope of the present invention.

The invention claimed is:

1. A method performed by an apparatus to receive and process forward error correction (FEC) encoded video data in a mobile digital television (DTV) data burst, the method comprising:
   detecting a preamble identifier flag in a reserved portion of a data field of the data burst, the preamble identifier flag identifying that the data field contains preamble training data, wherein said data burst contains a plurality of data fields, said reserved portion is not FEC encoded and said preamble training data is FEC encoded; and
   processing the encoded video data using the preamble training data, including:
      performing equalization of the FEC encoded video data by an equalizer, wherein said preamble training data is used to train the equalizer before processing of subsequent FEC encoded video data; and
      performing iterative FEC decoding of the FEC encoded video data by an iterative FEC decoder, wherein said preamble training data is used to train the iterative FEC decoder before processing subsequent FEC encoded video data.

2. The method of claim 1, wherein at least one data field contains preamble training data.

3. The method of claim 1, wherein at least one data field does not contain preamble training data.

4. The method of claim 3, wherein the at least one data field not containing preamble training data includes a reserved portion with a further identifier flag.

5. The method of claim 4, wherein the preamble identifier flag and the further identifier flag are complementary.

6. The method of claim 1, wherein the preamble identifier flag includes a pseudo random sequence.

7. The method of claim 1, wherein the reserved portion of the data field of the data burst is contained in a data field synchronization segment of the data field.

8. The method of claim 7 comprising:
detecting the data field synchronization segment,
wherein detecting the preamble identifier flag is performed in accordance with the detection of the data field synchronization segment.

9. Apparatus for receiving forward error correction (FEC) encoded video data in a mobile digital television (DTV) data burst, comprising:
a preamble identifier flag detector for detecting a preamble identifier flag in a reserved portion of a data field of the data burst, the preamble identifier flag identifying that the data field contains preamble training data, wherein said data burst contains a plurality of data fields, said reserved portion is not FEC encoded and said preamble training data is FEC encoded;
an equalizer for performing equalization of the FEC encoded video data using the preamble training data, said preamble training data being used to train the equalizer before processing of subsequent FEC encoded video data; and
an iterative FEC decoder for performing iterative FEC decoding of the FEC encoded video data using the preamble training data, said preamble training data being used to train the iterative FEC decoder before processing subsequent FEC encoded video data.

10. The apparatus of claim 9, wherein at least one data field contains preamble training data.

11. The apparatus of claim 9, wherein at least one data field does not contain preamble training data.

12. The apparatus of claim 11, wherein the at least one data field not containing preamble training data includes a reserved portion with a further identifier flag.

13. The apparatus of claim 12, wherein the preamble identifier flag and the further identifier flag are complementary.

14. The apparatus of claim 9, wherein the preamble identifier flag includes a pseudo random sequence.

15. The apparatus of claim 9, wherein the reserved portion of the data field of the data burst is contained in a data field synchronization segment of the data field.

16. The apparatus of claim 15 comprising:
a data field synchronization segment detector for detecting the data field synchronization segment,
wherein the preamble identifier flag detector detects the preamble identifier flag in accordance with the detection of the data field synchronization segment.

17. A method of transmitting forward error correction (FEC) encoded video data in a mobile digital television (DTV) data burst, comprising:
FEC encoding said video data and preamble training data in said data burst, wherein the data burst comprises a plurality of data fields, the preamble training data is in at least one data field of said data burst and a preamble identifier flag is in a reserved portion of the at least one data field of the data burst, the preamble identifier flag identifying that the at least one data field contains preamble training data, and wherein said reserved portion is not FEC encoded, said preamble training data being useful to train an equalizer and iterative FEC decoder in a receiver before processing of subsequent FEC encoded video data;
modulating said data burst; and
transmitting said modulated data burst.

18. An apparatus for transmitting forward error correction (FEC) encoded video data in a mobile digital television (DTV) data burst, comprising:
an FEC encoder for FEC encoding said video data and preamble training data in said data burst, wherein the data burst comprises a plurality of data fields, the preamble training data is in at least one data field of said data burst and a preamble identifier flag is in a reserved portion of the at least one data field of the data burst, the preamble identifier flag identifying that the at least one data field contains preamble training data, and wherein said reserved portion is not FEC encoded, said preamble training data being useful to train an equalizer and iterative FEC decoder in a receiver before processing of subsequent FEC encoded video data;
a modulator for modulating said data burst; and
an antenna for transmitting said modulated data burst.

19. An apparatus for transmitting forward error correction (FEC) encoded video data in a mobile digital television (DTV) data burst, comprising:
an FEC encoder for FEC encoding said video data and preamble training data in said data burst, wherein the data burst comprises a plurality of data fields, the preamble training data is in at least one data field of said data burst and a preamble identifier flag is in a reserved portion of the at least one data field of the data burst, the preamble identifier flag identifying that the at least one data field contains preamble training data, and wherein said reserved portion is not FEC encoded, said preamble training data being useful to train an equalizer and iterative FEC decoder in a receiver before processing of subsequent FEC encoded video data;
a modulator for modulating said data burst; and
means for transmitting said modulated data burst.

* * * * *